Patented May 6, 1924.

1,492,664

UNITED STATES PATENT OFFICE.

FRANK H. BEALL, OF BALTIMORE, MARYLAND.

PROCESS FOR THE MANUFACTURE OF ANTHRANILIC ACID.

No Drawing.    Application filed July 8, 1922.    Serial No. 573,715.

*To all whom it may concern:*

Be it known that I, FRANK H. BEALL, a citizen of The United States, residing at Baltimore, State of Maryland, have invented certain new and useful Improvements in Processes for the Manufacture of Anthranilic Acid, of which the following is a specification.

This invention relates to the manufacture of amino-benzoic acids by the reduction of the corresponding nitro-benzoic acids.

A process for the manufacture of anthranilic acid described in the literature consists in reducing o-nitro-benzoic acid by means of tin in the presence of hydrochloric acid, precipitating the tin with hydrogen sulfid, evaporating the solution, treating the concentrate with ammonia to alkaline reaction and then acidifying with acetic acid and recovering the anthranilic acid from the reaction mixture by crystallization. This process is too expensive for commercial utilization and it is therefore an object of my invention to provide a less expensive process.

If it is attempted to reduce nitro-benzoic acids to amino-benzoic acids by means of a metal having a high reduction potential, such as iron and zinc, in the presence of mineral acid in the absence of properly controlled conditions excessive amounts of highly colored by-products are formed. If it is attempted to reduce nitro-benzoic acids by the standard iron reduction, that is, by the use of iron and a small amount of hydrochloric acid as in the usual reduction of nitro-benzene to aniline a tarry mass is formed.

I have found that amino-benzoic acids may be successfully made by reduction of nitro-benzoic acids with iron or other strongly electro-positive metal such as zinc in the presence of mineral acid provided that the reducing conditions are controlled or modified to prevent undesired reactions and the formation of tarry or highly colored products.

The reduction of nitro-benzoic acids to amino-benzoic acids by means of iron in the presence of mineral acids may be successfully accomplished by the employment of relatively low temperatures, that is, temperatures substantially less than 60° C., say in the neighborhood of 35° C. I have found that it is desirable in this process to have present in the reaction mixture an amount of acid at least sufficient to supply the hydrogen required for the reduction and also to combine with the amino-group of the amino-benzoic acid formed. An amount in excess of this theoretical requirement is actually employed as some free hydrogen is liberated and its reducing effect is lost. This process however is rather slow and I prefer another method of controlling the reducing action of the iron or other metal which consists in reducing the reduction potential of the iron by supplying a salt of iron to the reaction mixture. Thus, in a specific application of the process in which o-nitro-benzoic acid is reduced by means of iron and sulfuric acid the reducing action is modified so as to prevent the formation of by-products by adding ferrous sulfate to the reaction mixture. In this method of procedure the reaction is also facilitated by the presence of the above-mentioned quantity of acid. When the reducing action of the iron is modified in this way, temperatures higher than 35° C. up to say 60° or higher may be employed, the reaction proceeds at a satisfactory rate, and by-products are not formed in objectionable quantity.

The temperature employed in the reducing operation will vary with the amount of metal salt present, the greater the concentration of the metal salt the higher may be the temperature employed.

My preferred process thus involves the control of the reducing reaction by varying both the temperature and the concentration of the metal salt in the reaction mixture. When no metal salt is present the temperature should be around 35° C. The temperature may be increased up to 60° C. or higher when the reaction mixture contains about 30 per cent or more of ferrous sulfate.

At the end of the reducing operation it is necessary to recover the amino-benzoic acid formed. Hereinafter for convenience I will refer to the specific application of the process in which anthranilic acid is formed by the reduction of o-nitro-benzoic acid and the reduction is accomplished by means of iron and sulfuric acid, ferrous sulfate being the metal salt formed in the reaction mixture and also the salt added to the reaction mixture for controlling the intensity of the reducing action. As will be seen there will be ferrous sulfate present in the reaction mixture whether an excess of ferrous sulfate is added for the purpose of controlling the reaction or not.

The anthranilic acid is recovered from the reaction mixture as follows: The acidity of the reaction mixture is reduced by means of a suitable neutralizing agent until the iron salt of anthranilic acid is precipitated. The amount of neutralizing agent required will depend upon the acidity of the reaction mixture which in turn depends upon the quantity of mineral acid employed. A variety of neutralizing agents may be employed, for instance, sodium hydroxide. I prefer however to use the ferrous hydroxid formed in a later stage of the process as will appear hereinafter. The precipitated iron salt of anthranilic acid is separated from the mother liquor by filtration and is washed. It is then treated with sufficient alkali, preferably caustic soda, to liberate the iron of the anthranilic acid salt as ferrous hydroxid and form the soluble sodium salt of anthranilic acid. The solution of the sodium salt of anthranilic acid is separated from the ferrous hydroxid by filtration and the anthranilic acid is then precipitated by acidifying the solution, the precipitated anthranilic acid being separated and washed and further purified if desired by known methods. It is however at this point of a very high grade of purity and further purification is unnecessary for most purposes.

In this last step of the process, that is, the step of acidifying the solution of the sodium salt of anthranilic acid, any suitable acid may be used, for instance sulfuric acid or hydrochloric acid, but I preferably use sulfur dioxid or sulfurous acid thus forming the anthranilic acid and sodium sulfite. The sodium sulfite may be used with the ferrous hydroxid or other alkali for neutralizing the reaction mixture resulting from the reducing operation. For this purpose the sodium sulfite solution after separation of the precipitated anthranilic acid is added to the reaction mixture from the reducing operation and the mixture boiled whereby sulfur dioxid is boiled off and the acidity of the mixture reduced.

The process is illustrated in the following examples:

*Example 1.*—10 parts by weight of o-nitro-benzoic acid is fed into a bath containing 28 parts by weight of 66° Bé. sulfuric acid and 300 to 400 parts by weight of water. An excess of iron such as scraps from stamping or the like are added and the liquid stirred until the reduction is complete. The reaction mixture is maintained at about 35° C. during the reaction which is completed after a period of 5 to 10 hours. The liquid is decanted from the excess of undissolved iron preferably through a filter and the acidity of the resulting separated solution is reduced with sodium hydroxid whereby the iron salt of anthranilic acid is precipitated from the solution of ferrous sulfate. The precipitate is separated, washed and then digested with sodium hydroxid preferably with heating say to 80° C. whereby the iron content of the salt is precipitated as hydroxid and the anthranilic acid is dissolved in the form of its sodium salt. The solution is separated from iron hydroxid and treated with mineral acid to liberate the anthranilic acid. The resulting precipitate of anthranilic acid is separated and washed.

*Example 2.*—10 parts by weight of o-nitro-benzoic acid, 28 parts by weight of 66° Bé. sulfuric acid and 300 to 400 parts by weight of a 33 per cent aqueous solution of ferrous sulfate are mixed and stirred with an excess of scrap iron until the reduction is complete, usually from 1 to 2 hours. At the beginning of the process the temperature of the reaction mixture preferably is from 60° to 70° C. and is gradually raised as the reaction proceeds to a temperature of about 95° or higher toward the conclusion of the reaction. When the reduction is complete the reaction mixture is treated for the recovery of anthranilic acid as described in Example 1.

Instead of neutralizing the reduction solution with sodium hydroxid the solution may be neutralized with ferrous hydroxid in which case the resulting ferrous sulfate solution is sufficiently pure to be used as the ferrous sulfate solution of Example 2 or for other purposes where ferrous sulfate is used.

The invention has been described with particular reference to the manufacture of anthranilic acid by the reduction of o-nitro-benzoic acid by means of iron but it is to be understood that the invention includes the manufacture of the amino-benzoic acids from the corresponding nitro-benzoic acids by means of metals other than iron.

The expression "reduction potential" as used in the foregoing description and in the appended claims is practically synonymous with the expression electrolytic potential and the description of certain metals as having a reduction potential greater than tin means that such metals are electro-positive to or more electro-positive than tin.

I claim:

1. Process of making amino-benzoic acids which comprises, subjecting a nitro-benzoic acid to the reducing action of a metal having a reduction potential greater than that of tin and a mineral acid in the presence of a salt of said metal, and limiting the intensity of the reducing action of said metal and mineral acid upon the nitro-benzoic acid to prevent undesired reactions by correlating the temperature of the reaction mixture with the metal salt content thereof.

2. Process of making amino-benzoic acids as defined in claim 1 in which the temperature of the reaction mixture is maintained at from 35° C. to the boiling temperature of the reaction mixture.

3. Process of making amino-benzoic acids as defined in claim 1 in which o-nitro-benzoic acid is reduced by means of iron and a mineral acid in the presence of a salt of iron and the temperature of the reaction mixture is varied from 35° C. upward as the iron salt content of the reaction mixture varies from zero upward.

4. Process of making amino-benzoic acids which comprises, subjecting a nitro-benzoic acid to the reducing action of a metal having a reduction potential greater than tin in the presence of a mineral acid, and controlling the intensity of the reducing action by adding a salt of said metal to the reaction mixture.

5. Process of making amino-benzoic acids as defined in claim 4 in which iron and sulfuric acid are employed for reducing the nitro-benzoic acid and ferrous sulfate is added to the reaction mixture.

6. Process of making anthranilic acid which comprises subjecting o-nitro-benzoic acid to the reducing action of iron and sulfuric acid in the presence of a solution containing about 30 per cent of ferrous sulfate at the beginning of the reaction.

7. Process of making anthranilic acid as defined in claim 6 in which the reaction mixture is maintained at a temperature of from 60° C. to the boiling point thereof.

8. Process of making anthranilic acid as defined in claim 6 in which the temperature of the reaction mixture is gradually increased from 60° C. at the beginning of the reduction to about the boiling temperature of the reaction mixture at the end of the reduction.

9. Process of making amino-benzoic acids which comprises, subjecting a nitro-benzoic acid to the reducing action of a metal having a reduction potential greater than tin in the presence of a mineral acid in excess of the quantity theoretically required to supply the hydrogen for the reduction and to combine with the amino group of the amino-benzoic acid.

10. Process of making amino-benzoic acids as defined in claim 1 in which mineral acid in excess of the quantity theoretically required to supply the hydrogen for the reduction and to combine with the amino group of the amino-benzoic acid formed is employed.

11. Process of making anthranilic acid which comprises, subjecting o-nitro-benzoic acid to the reducing action of a metal having a reduction potential greater than tin in the presence of mineral acid, reducing the acidity of the reaction mixture whereby the anthranilic acid salt of said metal is precipitated, treating said precipitate with alkali whereby the alkali salt of anthranilic acid and the hydroxid of said metal are formed, and treating said alkali salt of anthranilic acid with an acid whereby anthranilic acid and a salt of said alkali are formed.

12. Process of making anthranilic acid as defined in claim 11 in which o-nitro-benzoic acid is subjected to the reducing action of iron in the presence of sulfuric acid.

13. Process of making anthranilic acid as defined in claim 11 in which the intensity of the reducing action of the metal in the presence of a mineral acid is reduced by the addition of a salt of said metal to the reaction mixture.

14. Process of making amino-benzoic acids which comprises subjecting a nitro-benzoic acid to the reducing action of a metal having a reduction potential greater than tin in the presence of an excess of mineral acid, and precipitating a salt of said metal with the resulting amino-benzoic acid by reducing the acidity of the reaction mixture.

15. Process of making anthranilic acid as defined in claim 11 in which o-nitro-benzoic acid is subjected to the reducing action of iron and sulfuric acid in the presence of excess ferrous sulfate.

16. Process of making anthranilic acid which comprises, subjecting o-nitro-benzoic acid to the reducing action of iron in the presence of sulfuric acid and ferrous sulfate, adding sodium sulfite to the reaction mixture and boiling the same whereby the iron salt of anthranilic acid is precipitated, separating the precipitate from mother liquor and digesting the precipitate in sodium hydroxid solution, separating the resulting solution from insoluble material and acidifying the solution with sulfurous acid, and separating anthranilic acid from the acidified solution.

17. Process of making amino-benzoic acids which comprises, subjecting a nitro-benzoic acid to the reducing action of a mineral acid and a metal capable of forming an insoluble salt with the amino-benzoic acid, and neutralizing the reaction mixture whereby said insoluble salt of the metal and the amino-benzoic acid is precipitated.

In testimony whereof, I affix my signature.

FRANK H. BEALL.